March 19, 1963  F. J. FOUST ETAL  3,082,371
BATTERY TESTING DEVICE
Filed Feb. 18, 1959

INVENTORS
FLOYD J. FOUST
OLVEN W. CHILDRESS, JR.
JACK L. SNOWDEN
BY
THEIR ATTORNEY

United States Patent Office 3,082,371
Patented Mar. 19, 1963

3,082,371
BATTERY TESTING DEVICE
Floyd J. Foust, Oliven W. Childress, Jr., and Jack L. Snowden, Anderson, Ind., assignors to General Motors Corporation, Detroit, Mich., a corporation of Delaware
Filed Feb. 18, 1959, Ser. No. 794,048
3 Claims. (Cl. 324—29.5)

This invention relates to the testing of dry storage batteries and more particularly to the testing of dry storage batteries with high-frequency energy.

In the manufacture and subsequent sale of storage batteries, it is important for several reasons to be able to locate defective batteries before they are sold to the customer. In the past, many defects in batteries have remained undetected until put into actual use by the customer and this being after the dry battery has been filled with electrolyte. It is, accordingly, an object of this invention to provide a method of detecting faults in a storage battery prior to its being filled with electrolyte.

Another object of this invention is to provide a method of testing a storage battery for defects which includes applying high-frequency energy to the battery and then observing physical changes in the battery and in the high-frequency energy power supply that indicate certain faults in the battery.

Still another object of this invention is to provide a means for testing dry batteries which includes providing a radio or high-frequency oscillator circuit that has a condenser and wherein the dry storage battery itself acts as the condenser for the oscillator circuit.

A further object of this invention is to provide a method of detecting faulty lead burns in a storage battery by applying high-frequency energy to the storage battery while observing temperature changes of the lead burn.

Further objects and advantages of the present invention will be apparent from the following description, reference being had to the accompanying drawings wherein preferred embodiments of the present invention are clearly shown.

Figure 1:
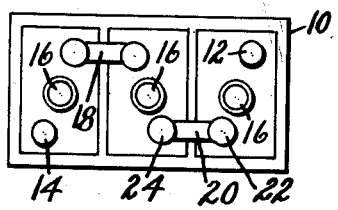
FIGURE 1 is a top view of a conventional three-cell storage battery.

Referring now to the drawings and more particularly to FIGURE 1, a storage battery generally designated by reference numeral 10 is illustrated. The storage battery has three cells and has a pair of terminal posts 12 and 14 formed of metal such as a lead-antimony alloy. The storage battery has vent plugs designated by reference numeral 16 covering the filler openings of the battery. The three cells of the storage battery are connected by metal strap connectors 18 and 20, one of which is illustrated in greater detail in FIGURE 2. It will be appreciated that the terminal posts 12 and 14 are connected with the battery plates in a conventional manner as well as the lead-antimony posts which are connected by straps 18 and 20. Although only a three-cell battery has been illustrated, it will be appreciated that the invention has equal applicability to any type of storage battery regardless of the number of cells.

Figure 2:
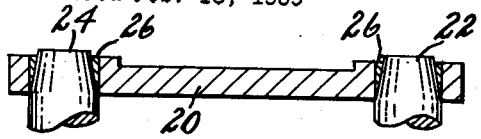
FIGURE 2 is a side view illustrating a strap connector connecting posts of a conventional storage battery.

In FIGURE 2, the strap connection between posts 22 and 24 is illustrated in greater detail. In most instances the connection between the strap 20 and posts 22 and 24 is made by slipping the strap over the posts as is illustrated in FIGURE 2, it being understood that the strap 20 has a pair of holes that accommodate the posts 22 and 24. When the strap is positioned as is shown in FIGURE 2, a quantity of lead in a molten condition is poured into the area designated by reference numeral 26 in order to form a good electrical and mechanical connection between the strap 20 and the posts 22 and 24. This connection of the strap 20 to the posts 22 and 24 is commonly termed a lead burn and when this connection is faulty it is ordinarily very difficult to detect. As will become more readily apparent hereinafter, it is a primary object of this invention to provide a method of detecting faulty lead burns, these being of a type offering high electrical resistance between the strap 20 and the posts 22 and 24.

Figure 4:
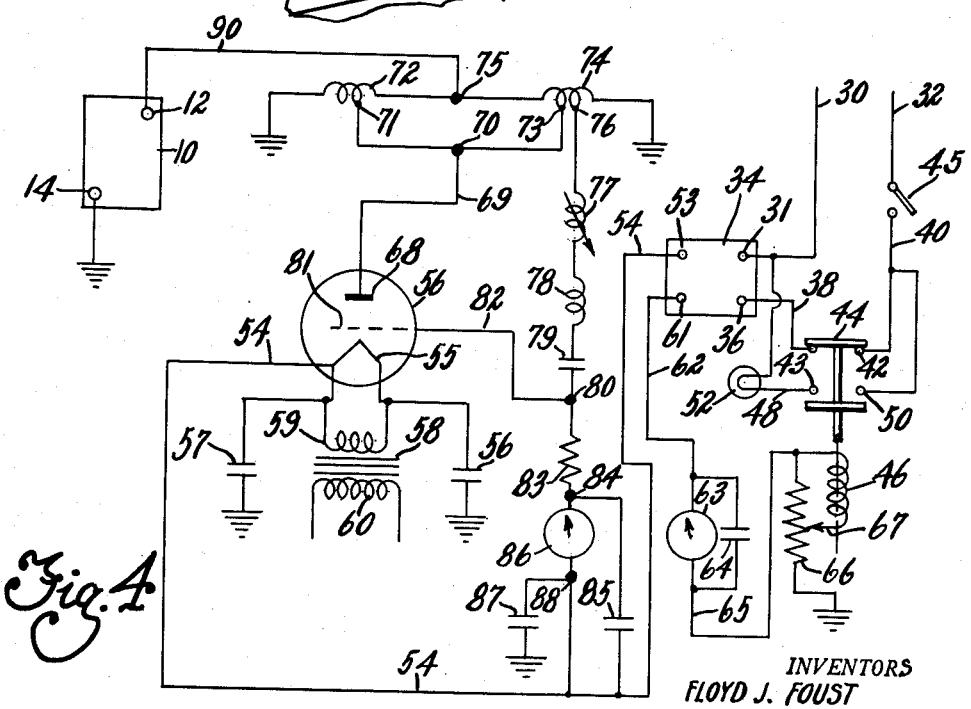
FIGURE 4 is a circuit diagram of a high or radio frequency oscillator used in applying high-frequency energy for a storage battery.

Referring now more particularly to FIGURE 4, a circuit diagram illustrating the oscillator circuit for generating the high-frequency energy that is applied to the battery is shown. The circuit includes a pair of leads 30 and 32 which form the A.C. input leads for the circuit and which are connected to a suitable supply of A.C. voltage. The lead 30 is connected to the input terminal 31 of a direct-current power supply designated in its entirety by reference numeral 34. The power supply contains the usual rectifiers and may be of any well-known conventional construction. The other input terminal 36 of the power supply is connected with a lead 38. The lead 38 is connected with lead 40 through a pair of switch contacts 42 which are closed by a movable contactor 44. The lead 40 is connected to lead 32 through a manually operable switch 45. The contactor 44 is arranged to be operated by a relay coil 46, and it is seen that the contactor in the low energized position of the actuating coil 46 completes a circuit between leads 38 and 40. When the relay coil 46 is energized sufficiently, the contactor 44 is moved upwardly to disconnect leads 38 and 40 and to connect leads 48 and 50 by shorting contacts 43. The movable contactor 44 is preferably connected with an overcenter spring so that once it is kicked to a position wherein it connects leads 48 and 50, it remains in that position until it is manually reset to once more connect leads 38 and 40. The lead 48 is connected with a conventional lamp 52 which becomes connected across the leads 30 and 40 whenever the contactor 44 is in its "up" position with the solenoid 46 being energized sufficiently to cause movement of the contactor 44. As will become more readily apparent hereinafter, the relay coil 46 is connected to respond to the output current of direct-current power supply 34 and under certain faulty conditions of the storage battery, the coil 46 will be energized sufficiently to cause an opening of the connection of the A.C. voltage with the direct-current power supply and will also cause the light 52 to become incandescent.

The output terminal 53 of direct-current power supply 34 is connected with a lead 54 which, as can be seen, connects with the cathode 55 of a triode tube designated by reference numeral 56. The cathode is supplied with heating current from a transformer designated by reference numeral 58 and having a secondary winding 59 and a primary winding 60. The primary winding, as is well known to those skilled in the art, is connected with a suitable supply of A.C. voltage. The cathode 55, in addition to being connected to the lead 54, is connected to ground through condensers 56 and 57. The other output terminal 61 of the direct-current power supply 34 is connected with a lead 62. The lead 62 connects to one side of a milliammeter designated by reference numeral 63 and shunted by a condenser 64. The opposite side of milliammeter 63 is connected with a lead 65 which is connected to one side of relay coil 46 and to one side of an adjustable resistor 66. The relay coil 46, as is clear from the drawing, is connected with lead 65 and to the adjustable tap 67 on resistor 66. One side of the resistor 66, opposite from that connected to lead 65, is connected directly to ground as shown. Thus, it is apparent that when a predetermined voltage is developed across resistor 66, this voltage will also be impressed across relay coil 46 and when this voltage reaches a preedtermined value, the coil 46 will be energized sufficiently to cause an opening of the A.C. supply to direct-current power supply 34 and will also cause the lamp 52 to become incandescent.

The plate electrode 68 of tube 56 is connected with a lead 69 which is, in turn, connected with junction 70. The junction 70 is connected with a tap point 71 on inductance 72 and with a tap point 73 on inductance 74. The inductances 72 and 74 have one of their sides connected with a junction 75, whereas the opposite sides of these inductances are connected to ground as shown. The inductance 74 has a tap point 76 which is connected with a variable inductance 77 and with another inductance 78. The inductance 78 is connected with a condenser 79 which has one side thereof connected with junction 80. The junction 80 is connected with the grid electrode 81 of tube 56 via lead 82.

The junction 80 is connected to one side of a resistor 83, the opposite side of the resistor being connected with junction 84. A condenser 85 is connected between junction 84 and lead 54 and a milliammeter 86 is likewise connected between junction 84 and lead 54. A condenser 87 is connected between junction 88 and ground as is clearly apparent from the circuit diagram.

The battery to be tested is connected with the circuit just described when it is in a dry condition, that is, prior to the time that the battery is filled with electrolyte. Thus, the junction 75 is connected with one terminal post 12 of the storage battery 10 through a lead 90, whereas the other terminal post of the storage battery 10 is connected directly to ground as shown. From an inspection of the circuit diagram and a perusal of the foregoing description, it will be apparent that with the battery connected as shown, the circuit described is a tuned grid, tuned plate oscillator with the battery 10 forming the condenser of the plate tank circuit. When the circuit is energized from the direct-current power source, a high-frequency circulating current is established within the dry storage battery and as noted above, it operates as a capacitor for the plate tank circuit.

Figure 3:
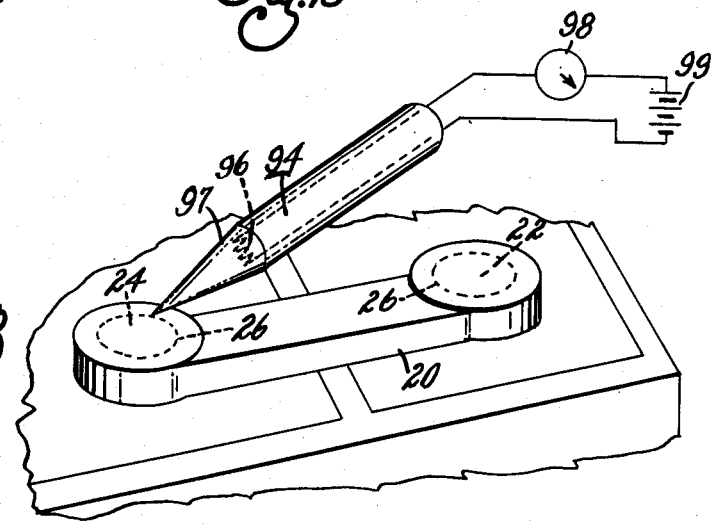
FIGURE 3 is a perspective view illustrating the method of checking the temperature of a lead burn during the time that high-frequency energy is being applied across the terminal posts of a storage battery.

It has been found that when high-frequency current is passed through a dry-charge battery, the lead burns 26, if faulty, greatly increase their temperature as compared with a storage battery having good lead burns. Thus, if it is desired to check as to whether the lead burns are faulty, it is only necessary to check the temperatures of the lead burns during the time that the high-frequency energy is being applied to the storage battery. FIGURE 3 illustrates one method of detecting the temperature of the lead burns during the time that the storage battery is being supplied with high-frequency energy. Thus, in FIGURE 3, a probe 94 containing a resistance element 96 that varies in resistance with temperature is shown touching the lead burn area of the terminal post 24. The resistance element 96 could be a thermistor or any other resistance element that changes its resistance with change in temperature and will, of course, be mounted within the nose 97 of the probe so as to be in heat conductive relation with the lead burn area 26. The thermistor or variable resistance 96 is connected in series with a current meter 98 that may be calibrated to indicate temperature and in series with a source of voltage designated by reference numeral 99. As the resistance of resistance element 96 changes with temperature, the current reading of meter 98 will, of course, change to indicate a certain temperature of the lead burn. Where the lead burn temperature is abnormally high, this indicates that the particular lead burn is faulty and the battery will have to be reworked. It will, of course, be appreciated that the temperature of the lead burns might be detected in other ways than that illustrated in FIGURE 3 without departing from the teachings of this invention.

The method of testing storage batteries described herein is also effective to detect faults in the battery other than bad lead burns. Thus, the omission of a battery separator will be detected by a great increase in current from direct-current power supply 34 and the relay coil 46 will be kicked out to indicate this condition. If a battery separator has a hole or other serious defect, this will also be detected by a kicking out of relay 46. If a positive and negative plate of the battery are shorted, this will be indicated by a kicking out of the relay 46. It will, of course, be appreciated that these defects might be determined by visual inspection of other parts of the circuit such as the milliammeter 63. Thus, batteries without faults will give certain current readings of the milliammeter 63 and any abnormal current reading will thus indicate a fault in the battery.

By way of disclosure and not by way of limitation, the circuit constants for the circuit illustrated in FIGURE 4 may have the following values where the direct-current power supply has a 6000-volt D.C. output and where the frequency of the circulating current in the storage battery is 14.5 megacycles:

Condenser 79—100 mmfd., 10 kv., vacuum
Condenser 87—500 mmfd., 20 kv., disc.
Condenser 56—500 mmfd., 20 kv., disc.
Condenser 57—500 mmfd., 20 kv., disc.
Condenser 85—.003 mfd., 6 kv., mica
Condenser 64—.003 mfd., 6 kv. mica
Meter 86—0–200 ma.
Meter 63—0–200 ma.
Resistor 83—4000 ohms, 200 watts
Transformer 58—Pri. 220 v.; sec. 7.5 v. at 51 amps., 20,000-volt insulation
Tube 56—3x2500 F3
Inductance 72—3 turns 5/16" copper tubing 2¼" long, 2¼" inside dia. tapped at ¼ turn
Inductance 74—Same as inductance 71 except grid tap is at 9/16 turn
Inductance 77—3½ turns #9 copper wire 1" long, 1 13/16" inside dia., adjustable
Inductance 78—4 turns #9 copper wire 1⅛" long, 1 13/16" inside dia.

In the circuit described hereinbefore for applying high-frequency energy to a storage battery, the storage battery has formed the capacitance for the tank circuit of a tuned grid, tuned plate oscillator. It will be apparent, however, that other oscillator circuits might be used to apply high-frequency energy to the terminal posts of a storage battery. In any such arrangement, it is, of course, necessary to take into consideration the capacitance of the dry storage battery when coupling it to an oscillator circuit.

While the embodiments of the present invention as

What is claimed is as follows:

1. A method of testing a dry storage battery for defects, the steps comprising, providing a source of high-frequency energy powered by a direct current power supply, applying high-frequency energy to said storage battery by connecting the output terminals of said source across the terminal posts of the battery, and then measuring the output current of the power supply.

2. A method of indicating faulty lead burns in a dry storage battery having two terminal posts and separate battery plates connected therewith, the steps comprising, passing a high frequency current through said battery by connecting said terminal posts with a source of high frequency energy, and then measuring the temperature of the lead burn while said high frequency is being applied to the battery.

3. A method of indicating faulty lead burns in a dry storage battery having separated battery plates and external terminal posts, the steps comprising, applying high frequency energy to said storage battery by connecting said terminal posts with a source of high frequency energy, and then measuring the temperature of the lead burn.

References Cited in the file of this patent

UNITED STATES PATENTS

| | | |
|---|---|---|
| 2,264,968 | De Forest | Dec. 2, 1941 |
| 2,518,045 | May | Aug. 8, 1950 |
| 2,593,131 | Foust et al. | Apr. 15, 1952 |
| 2,645,563 | Jensen | July 14, 1953 |
| 3,020,745 | Sielicki | Feb. 13, 1962 |